United States Patent [19]

Moertel

[11] 4,112,555
[45] Sep. 12, 1978

[54] SLIDE FASTENER

[75] Inventor: George B. Moertel, Crawford, Pa.

[73] Assignee: Textron Inc., Providence, R.I.

[21] Appl. No.: 806,487

[22] Filed: Jun. 14, 1977

Related U.S. Application Data

[62] Division of Ser. No. 539,802, Jan. 9, 1975, Pat. No. 4,044,431.

[51] Int. Cl.² ............................................. A44B 19/12
[52] U.S. Cl. .............................................. 24/205.13 C
[58] Field of Search ................................. 24/205.13 C

[56] References Cited

U.S. PATENT DOCUMENTS

| | | | |
|---|---|---|---|
| 2,018,099 | 10/1935 | Sundback | 24/205.13 C |
| 2,300,442 | 11/1942 | Wahl | 24/205.13 C |

Primary Examiner—Bernard A. Gelak

[57] ABSTRACT

Coupling elements of slide fastener stringers are deformed by transverse forces of mating elements. The longitudinal spacing of coupling elements is modified by stretching or shrinking tape portions supporting the elements.

4 Claims, 10 Drawing Figures

U.S. Patent  Sept. 12, 1978  Sheet 1 of 4  4,112,555
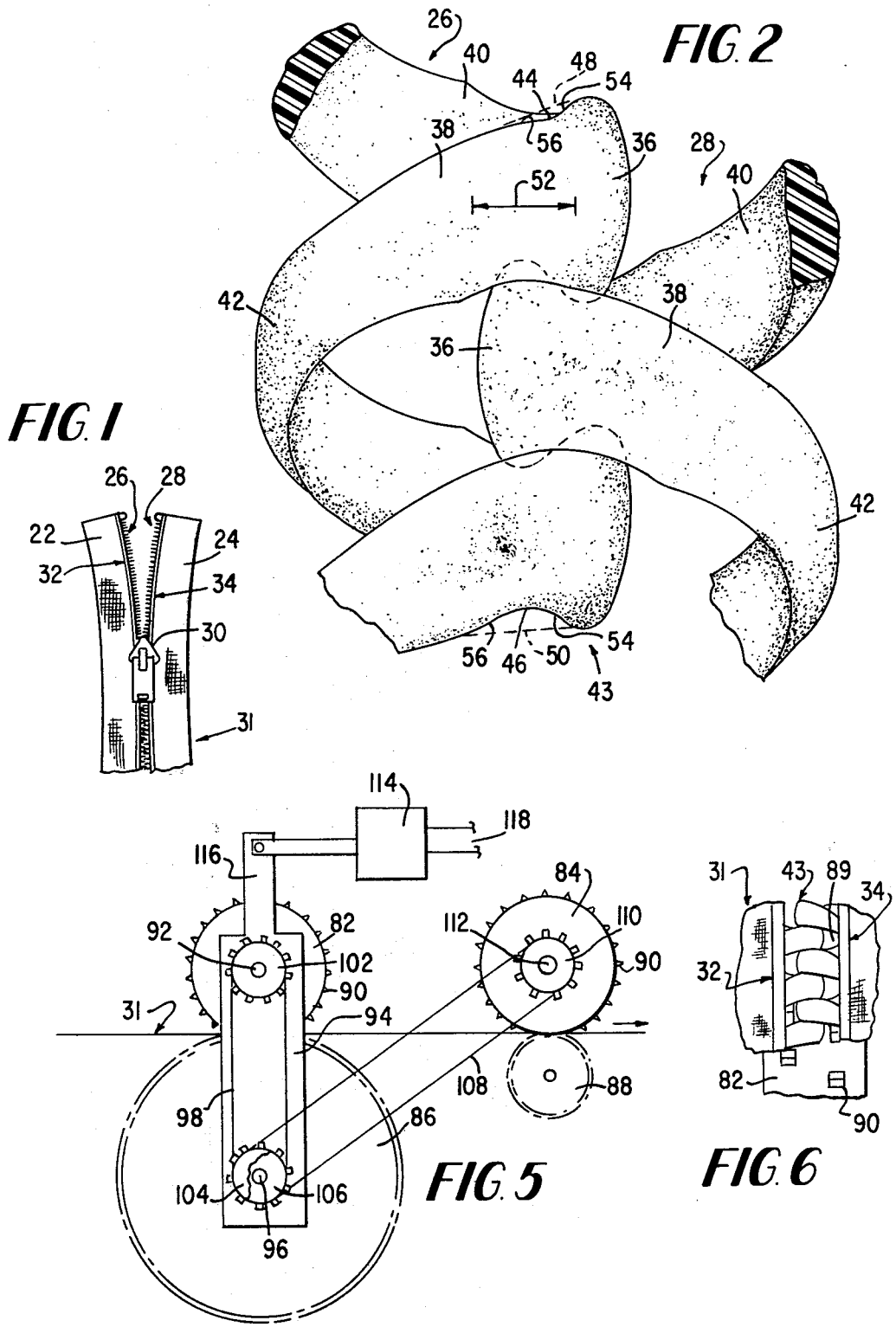

SLIDE FASTENER

CROSS REFERENCE TO RELATED APPLICATION

This application is a divisional application of my copending U.S. application Ser. No. 539,802, now U.S. Pat. No. 4,044,431 filed Jan. 9, 1975.

BACKGROUND OF THE INVENTION

1. Field of the Invention

The invention relates to fasteners having interlocking elements on adjacent edges of respective tapes which can be opened and closed by a slider, and to methods and apparatus for making the fasteners.

2. Description of the Prior Art

Prior art slide fasteners, such as fasteners utilizing spiral coupling members, coil or meander ladder coupling members, plastic or metal molded scoop coupling elements, or the like, are sometimes defective due to variation in the spacing of coupling elements or head portions along the length of the fastener; elements spaced too far apart decrease the crosswise strength of the fastener, and elements spaced too closely together result in increased difficulty in slider movement and excessive rigidity. Also, variation in the spacing of coupling elements makes it difficult to match stringers, i.e., stringers with different spacing of coupling elements interlocked together produce a curved slide fastener rather than a straight fastener.

The problem of variation in spacing of the engaging elements of coupling members is particularly acute in spiral slide fasteners wherein the interlocking of the engaging elements results from the twist imparted to portions of the oblate cross-sectional filament coiled to form each coupling member. The engaging surfaces of interlocked spiral coupling members have only a small incline to the direction of crosswise forces and thus are subject to being pulled apart by crosswise forces particularly if the spacing between engagement elements is too large. U.S. Pat. No. 2,541,729 discloses an apparatus and method of making interlocking coils wherein convolutions of the coils wound on mandrels are formed by bending and twisting of the filament and notching of the edges of the filament loops by the pressure of one convolution on another as the interlocked coils are moved by longitudinal forces along the mandrels through a heating element; such notching and close spacing of interlocking coils result in decreased ease of operation in slide fasteners.

SUMMARY OF THE INVENTION

The invention is summarized in a stringer for a slide fastener including a tape; a spiral coupling member secured to one longitudinal edge of the tape and formed from a continuous filament into successive coupling sections; each coupling section having a head portion, a pair of leg portions extending from respective opposite sides of the head portion, and a heel portion interconnecting to a leg portion of an adjacent coupling section; the continuous filament having an oblate cross section perpendicular to the filament with the longest dimension of the cross section in the head portions extending substantially parallel to the one edge of the tape and with the longest dimension of the cross section in the leg portions revolving from substantially parallel to the one edge of the tape at the head portions to an oblique angle to the tape at the heel portions; and each of the leg portions being deformed in the longest dimension of the cross section contiguous the respective head portion to reduce the longest dimension of the cross section.

An object of the invention is to produce a slide fastener having improved crosswise strength and improved ease of operation.

Another object of the invention is to reform the spacing between coupling elements attached to one longitudinal edge of a tape in a slide fastener stringer by stretching or shrinking the tape.

It is also an object of the invention to reform head portions of coupling elements attached to a tape of a stringer to improve the interlocking portions of the head portion as well as to improve ease of operation.

An advantage of the invention is that any righthand stringer or left-hand stringer of slide fastener chains can be mated with its respective counterpart and if separated can be mated with any other respective left-hand stringer or right-hand stringer resulting in fastener chains having substantially no curvature.

One feature of the invention is that a standard stringer utilizing a spiral-type filament coupling member can be modified by subjecting the coupling member to crosswise forces from a mating member to deform leg portions where contiguous with head portions of the coupling member to increase crosswise strength.

Other objects, advantages and features of the invention will become apparent in the description of the preferred embodiment taken in conjunction with the accompanying drawings.

BRIEF DESCRIPTION OF THE DRAWINGS

FIG. 1 is a plan view of a slide fastener manufactured in accordance with the invention.

FIG. 2 is a plan view of a pair of coupling members of the fastener of FIG. 1.

FIG. 5 is a detailed diagram of a mechanism for sensing the spacing of coupling elements in the apparatus of FIG. 4.

FIG. 6 is a bottom view of a chain portion and toothed wheel portion of the mechanism of FIG. 5.

DESCRIPTION OF THE PREFERRED EMBODIMENT

Figure 3:
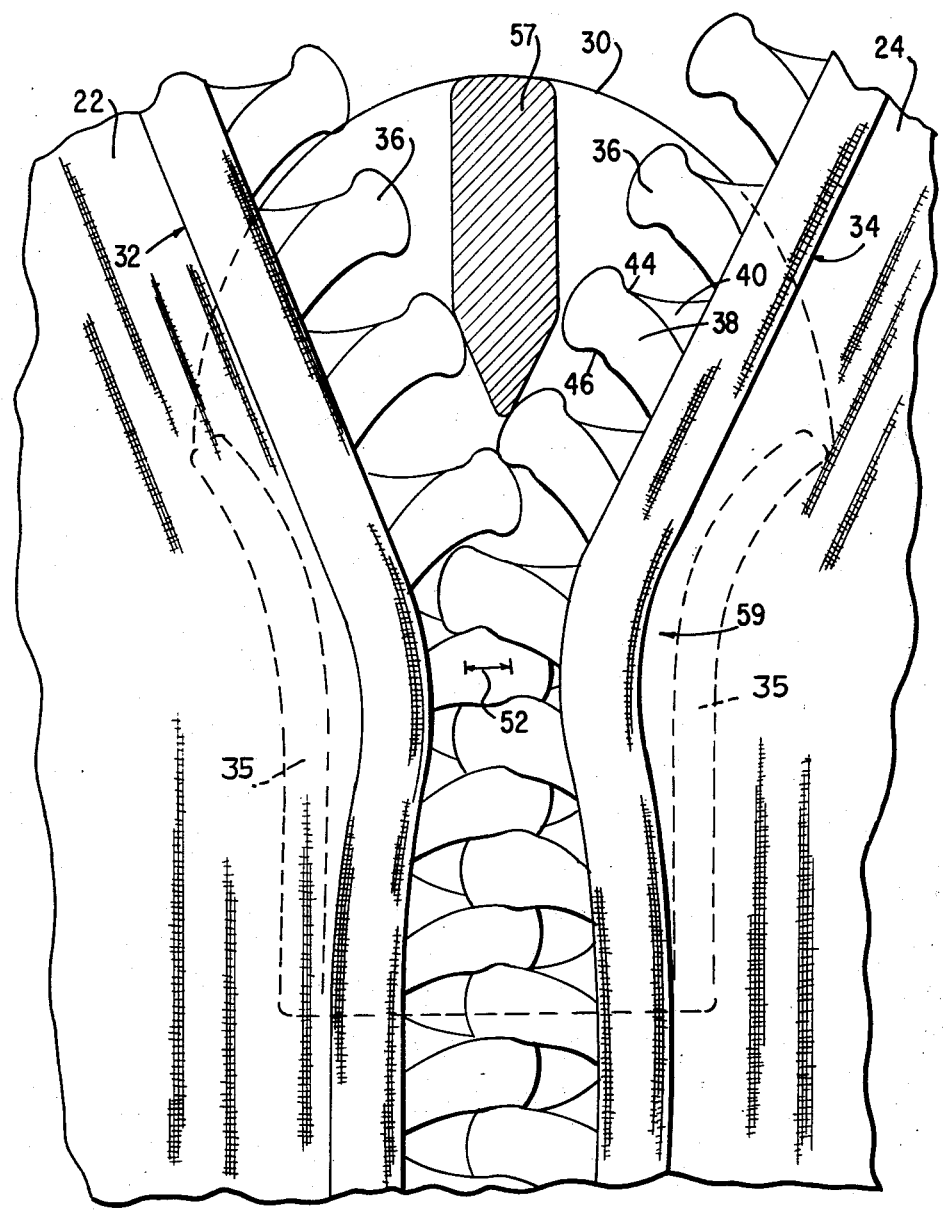
FIG. 3 is an enlarged plan view of a portion of the slide fastener of FIG. 1.

As illustrated in FIG. 1, a slide fastener manufactured in accordance with the invention includes a pair of planarly disposed tapes 22 and 24, a pair of coupling members indicated generally at 26 and 28 attached to adjacent edges of the respective tapes 22 and 24, and a slider 30 mounted for sliding movement along the adjacent edges of the tapes over the coupling members 26 and 28. The tape 22 and the coupling member 26 form a left stringer while the tape 24 and the coupling member 28 form a right stringer, and the left and right stringer when coupled together form a chain indicated generally at 31. The coupling members 26 and 28 are capable of closing and opening with each other in response to movement of the slider 30 and engagement by flanges 35, FIG. 3, and center post 57 of the slider 30. The stringers may include respective beads 32 and 34 for supporting the coupling members 26 and 28 and for engaging the flanges 35.

As shown in FIG. 2 each of the coupling members 26 and 28 is formed from a continuous filament having an oblate cross section, such as a D-shaped cross section perpendicular to the filament. Suitable filaments are solid or hollow monofilaments of thermoplastic material, such as nylon or polyester. Each filament is formed into successive coupling sections or convolutions which include a head portion 36, a pair of leg portions 38 and 40 extending from opposite sides of the head portion 36, and a heel portion 42 interconnecting to a leg portion of an adjoining section. The longest dimension of the oblate cross section perpendicular to the filament extends substantially parallel to the one edge of the tape in the head portions. The filament is twisted in the leg portions 38 and 40 such that the longest dimension of the oblate cross section in the leg portions revolves from parallel to the adjacent edges of the tapes 22 and 24 at the head portions 36 to an oblique angle to the tapes 22 and 24 at the heel portions 42. The leg portions 38 and 40 and the head portion 36 of each coupling section together form an engaging or coupling element indicated generally at 43.

Each of the leg portions 38 and 40 has recesses or notches 44 and 46 formed in opposite sides thereof contiguous the head portions 36. The notches 44 and 46 are formd by deforming the leg portions 38 and 40 from the contour shown by the phantom lines 48 and 50 throughout a length indicated at 52 of the leg portions. The notches 44 and 46 are generally obtuse and scalene triangular in cross section, with the head portions 36 bordering the shortest side 54 of the notches 44 and 46 and with the leg portion bordering the next shortest side 56 of the notches 44 and 46. Between the sides 56, each of the leg portions 38 and 40 has a substantially uniform dimension parallel the longitudinal edges of the tapes 22 and 24 and reduced from the longest dimension of the cross section of the filament from contiguous the head portions 36 to points where the twist of the filament in the leg portions results in a dimension which is parallel to the longitudinal edges of the tape and is equal to the substantially uniform dimension between sides 56.

The tapes 22 and 24 are formed from a material which may be either stretched or shrunk or both stretched and shrunk. Suitable materials include thermoplastic heat-shrinkable materials such as polyester and nylon textile materials. Such thermoplastic materials in the tapes 22 and 24 and the coupling members 26 and 28 have a glass transition temperature above which they become soft or plastic and can be readily deformed. Also, these materials readily shrink when heated to an elevated temperature unless restrained from shrinking. Materials other than thermoplastic materials and which can be treated to make them stretchable or shrinkable may also be used: for example, cotton textile materials may be treated with ammonia and the like to make them stretchable or shrinkable.

Figure 4:
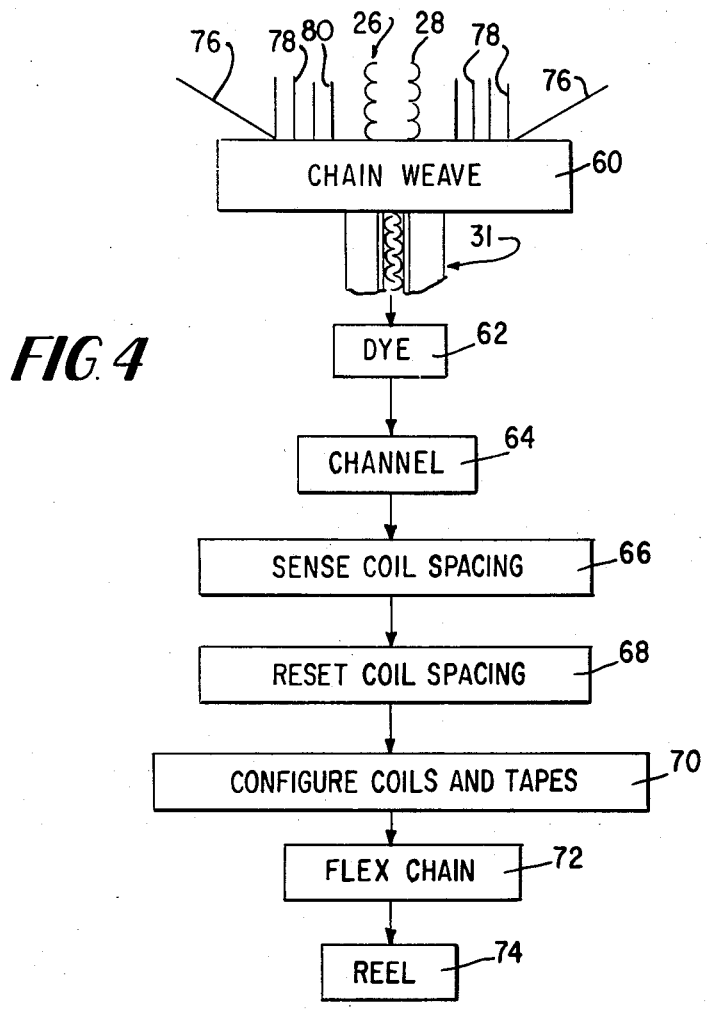
FIG. 4 is a diagram of an apparatus for manufacturing a chain for the slide fastener of FIG. 1.

An apparatus for making the improved chain 31 of the slide fastener includes, as shown in FIG. 4, a chain weaving mechanism 60, a dyeing mechanism 62, a channelling mechanism 64, a coil-spacing sensing mechanism 66, a coilspacing reset mechanism 68, a coil and tape configuring mechanism 70, a chain-flexing mechanism 72 and a reeling mechanism 74. The chain-weaving mechanism 60 is a suitable mechanism well known in the prior art for weaving weft thread 76 with warp threads 78, cords 80, and the coils 26 and 28 for forming the respective left and right stringers of the slide fastener. The dyeing mechanism 62 is any suitable facility for dyeing the chain 31 to a selected color. The channel mechanism engages the tapes 22 and 24 (FIG. 1) adjacent the beads 32 and 34 to press or flatten the tapes 22 and 24 and produce suitable channels or tracks for the flanges 35 (FIG. 3) of the slider 30.

A suitable coil-spacing sensing mechanism 66, illustrated in FIGS. 5 and 6, includes a movable wheel 82 and a stationary wheel 84 for engaging the slide fastener chain 31 as it is pulled over respective rollers 86 and 88. Wedge-shaped teeth 90 on the periphery of the wheels 82 and 84 are spaced to engage interstices 89 between successive convolutions of the engaging elements 43. The movable wheel 82 is mounted on a shaft 92 which is rotatably mounted in an arm 94 which is pivotable about a shaft 96. A chain 98 interconnects sprocket wheels 102 and 104 mounted on the shaft 92 and the shaft 96, respectively. A sprocket wheel 106 also mounted on the shaft 96 is interconnected by a chain 108 to a sprocket wheel 110 mounted on a shaft 112 connected to the wheel 84. The sprocket wheels 102 and 110 have the same number of teeth and the sprocket wheels 104 and 106 similarly have the same number of teeth so that the wheels 82 and 84 are maintained in predetermined relative rotative positions. For example, with the sprocket wheels 102, 104, 106 and 110 all equal, the rotative position of the sprocket wheels will be equal (neglecting curvature about roller 86) to make the spacing between wheels 82 and 84 directly proportional to the spacing of a set number of engaging elements 43 between wheels 82 and 84; and with the sprocket wheels 104 and 106 larger than the sprocket wheels 102 and 110, the rotative position of the wheel 82 relative to the wheel 84 will be also proportional to the spacing of the engaging elements 43 between the wheels 82 and 84 so that spacing between the wheels 82 and 84 will be an amplification of the spacing of the engaging elements 43 between wheels 82 and 84. A transducer 114 is connected to an extension 116 of the arm 94 for converting the movement of the arm 94 into electrical signals which have a magnitude, frequency, or other property proportional to the position of the arm 94 and thus the spacing of the engaging elements in the chain 31.

Figure 7:
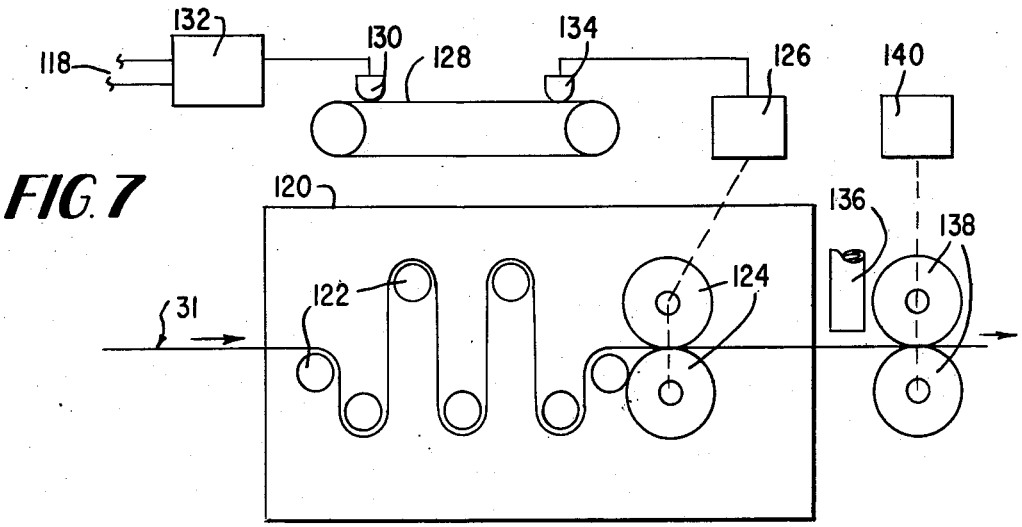
FIG. 7 is a detailed diagram of a mechanism for resetting the spacing of coupling elements in the apparatus of FIG. 4.

The coil-spacing reset mechanism 68, shown in FIG. 7, has heating means, such as a suitably heated enclosure 120, with rollers 122 for guiding the slide fastener chain 31 to expose the chain 31 sufficiently to heat the chain to the desired elevated temperature, preferably above the glass transition temperature, while maintaining sufficient tension on the chain to maintain its sensed longitudinal spacing of engaging elements. The electrical signals on lines 118 are applied to a suitable delay facility such as a tape head amplifying and conditioning circuit 132 connected to a tape recording head 130 which engages a continuous magnetic tape 128. The circuit 132 is any suitable circuit which may amplify the signals from transducer 114, may convert the signals from transducer 114 to another form (i.e., from DC to AC) and/or otherwise may suitably condition the signals from transducer 114 for application to recording head 130. The circuit 132 may also supply erase signals to the head 130 to erase the tape 128 prior to recording signals. A reading head 134, positioned to sense the signals recorded on the tape 128 a predetermined time delay after recording by the head 130, is connected to a variable speed motor mechanism 126 which is connected to rollers 124 such as to drive the rollers 124 at corresponding faster speeds when the signals from head 134 indicate a spacing of engaging elements which is too large (too few engaging elements per unit length) and to drive the rollers 124 at corresponding slower speeds when the signals from head 134 indicate a spacing of engaging elements which is too small (too many engaging elements per unit length). The rollers 124 are adapted for suitably gripping and moving the chain 31 from the rollers 122 in the heating enclosure 120. Cooling means, such as means 136 for directing a cooling flow of air, is positioned outside the heating enclosure to form a cooling station for cooling the chain 31. Constant speed rollers 138 drivingly connected to a constant speed motor mechanism 140 are adapted for gripping and advancing the chain past the cooling station 136. The spacing between the variable speed rollers 124 and the cooling station 136 is selected to have a predetermined relationship, such as being equal, to the spacing between the rollers 182 and 184 (FIG. 5) of the sensing station 66. The variable speed motor mechanism 126 and its driving signals are selected to produce a suitable variable change in the length of the chain 31, i.e., to stretch the chain 31 or to allow the chain 31 to shrink between the variable speed rollers 124 and the cooling station 136, to produce a chain 31 that has uniform spacing of the engaging elements 43 throughout the length of the chain 31.

Figure 8:
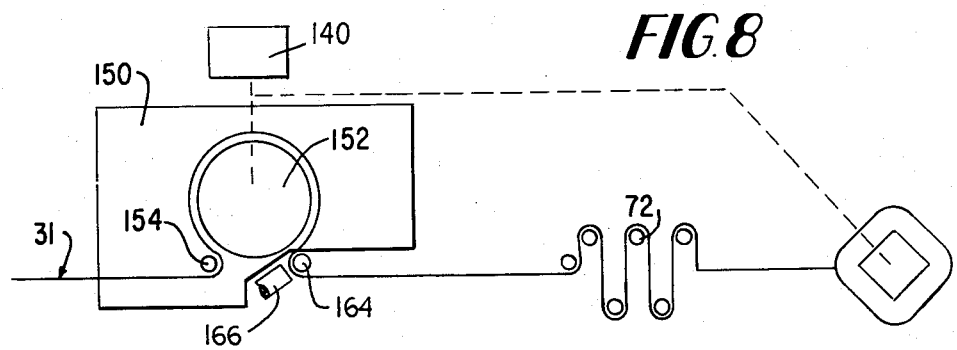
FIG. 8 is a detailed diagram of a configuring mechanism, flexing mechanism, and reeling mechanism in the apparatus of FIG. 4.
Figure 9:
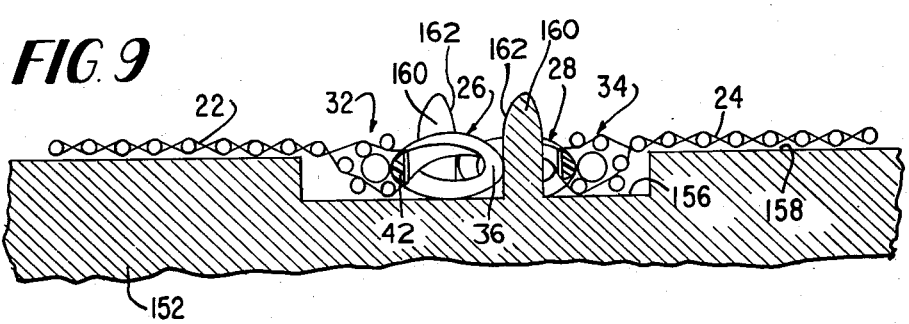
FIG. 9 is a cross-sectional view of a portion of a configuring wheel of the mechanism in FIG. 8.
Figure 10:
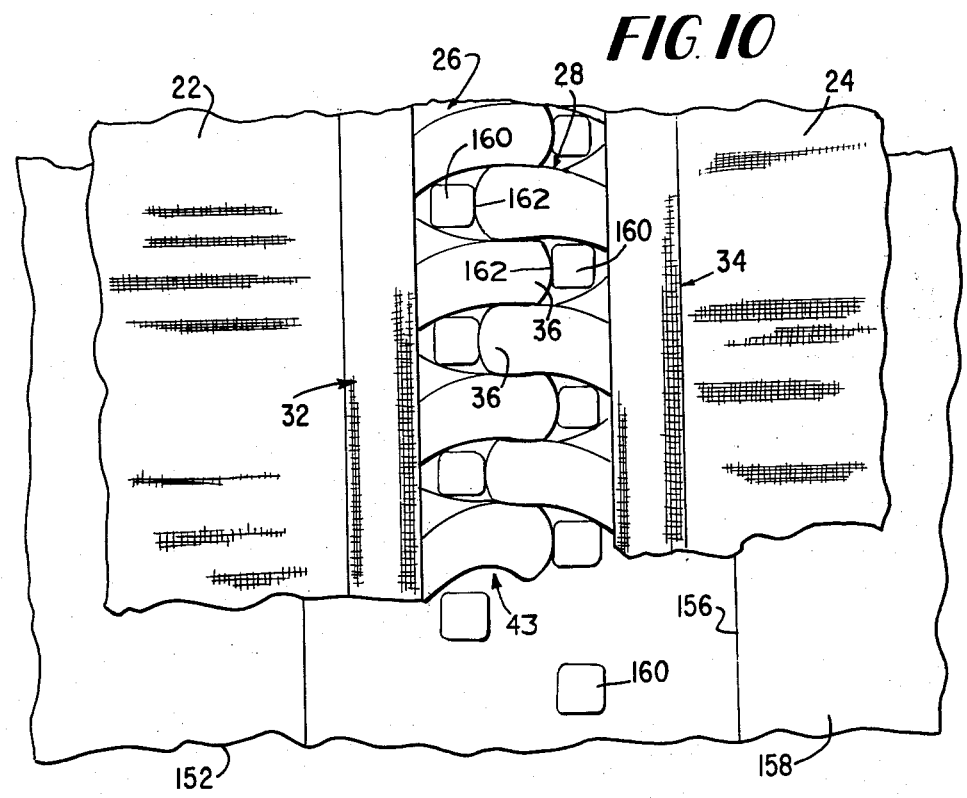
FIG. 10 is a plan view of the configuring wheel portion illustrated in FIG. 9.

The coil and tape configuring mechanism 70, illustrated in FIGS. 8, 9 and 10, includes a heating means, such as heating enclosure 150, for heating the chain 31 to the desired elevated temperature, preferably above the glass transition temperature. A roller 154 is positioned to press the chain 31 onto a configuring wheel 152 which has an annular channel 156 centrally located in its periphery for receiving the central portion of the chain 31 such as the beads 32 and 34 or inner portions of the tapes 22 and 24 and the interlocking members 26 and 28. A plurality of forming wedges or teeth 160 are mounted on the wheel 152 for wedging into the interstices between the leg portions of adjoining convolutions of each coupling member and for wedging between the heel portions of each coupling member and the head portions 36 of the opposite coupling member such as to engage camming surfaces 162 of the teeth 160 against the head portions 36 to force the head portions 36 on each coupling member away from the heel portions 42 of the opposite coupling member. Further, the spacing of the teeth 160 is designed to further adjust and set the spacing of the convolutions of the coupling members or engaging elements 43 by engagement of the teeth 160 with the leg portions of adjoining convolutions. The depth of the channel 156 is selected so that the outer portions of the tapes 22 and 24 are stretched by engagement with the peripheral portion 158 of the wheel on opposite sides of the channel 156 or are allowed to shrink into engagement with the peripheral portions 158 such that the length of the outer portions of the tapes 22 and 24 has a predetermined length relative to the length of the inner portion of the tapes 22 and 24 and the coupling members 26 and 28. The wheel 152 is driven by the driving mechanism 140 in synchronism with the rest of the chain-forming apparatus. A roller 164 is positioned to guide the chain 31 as it is pulled off the configuring wheel 152. Cooling means 166 forming a cooling station is positioned outside the enclosure 150 to rapidly cool the chain 31 as it exits from the heating chamber 150 to set the chain in its configured state.

The flexing mechanism 72 includes a plurality of rollers for guiding the chain 31 in a tortuous path to flex the chain 31. The reeling mechanism 74 may also be rotated through a suitable frictional connection or the like with the drive mechanism 140.

In operation of the apparatus of FIG. 4, the weft threads 76 are interwoven with the warp threads 78, the cords 80 and the coupling members 26 and 28 in the weaving mechanism 60 forming each of the tapes 22 and 24 as well as securing the coupling members 26 and 28 to longitudinal edges of the tapes to form stringers. A pair of left and right stringers are then joined by interengaging the coupling members 26 and 28 to form the slide fastener chain 31. Subsequently, the slide fastener chain 31 is dyed by the dyeing mechanism 62 and then channeled by the channel mechanism 64. In the coil-spacing sensing mechanism 66, the spacing between the convolutions on the chain 31 is sensed to operate the coil-spacing reset mechanism 68 to stretch or shrink seleced portions of stringers to produce the uniform spacing between the head portions or engaging elements of the coupling members 26 and 28 longitudinally throughout the chain 31. The chain 29 passes to a coil and tape configuring mechanism 70 where the interlocking coupling members are reformed and the tapes 22 and 24 are fixed in length to improve the slide fastener chain 31 as well as to maintain and further set the uniform spacing of the convolutions of the coupling members 26 and 28 throughout the length of the chain 31. After configuration, the chain 31 passes through flexing mechanism 72 and then to the reeling mechanism 74 for subsequent use in forming a slide fastener and the like.

More particularly, as shown in FIGS. 5 and 6, the spacing of the convolutions of the coupling members 26 and 28 of the chain 31 is sensed as the chain 31 is maintained taut and pulled past rollers 82 and 84 where the teeth 90 engage the interstices 89 between the respective convolutions. When the diameters of sprocket wheels 102, 104, 106 and 110 are equal, the number of engaging elements 43 or convolutions of members 26 and 28 between the wheels 82 and 84 remains constant so that the distance between the wheels 82 and 84 is directly proportional to the spacing of the engaging elements 43 between wheels 82 and 84. When the spacing of the elements 43 between wheels 82 and 84 is too large, the arm 94 is pivoted to the left causing the transducer 114 to produce signals on line 118 indicative of the excessive spacing. Conversely, when the spacing of the engaging elements between wheels 82 and 84 is too small, the arm 94 is pivoted to the right, causing transducer 114 to produce signals on lines 118 indicative of the short spacing of the elements.

At the coil-spacing reset mechanism 68 in FIG. 7, the signals on lines 118 are stored on the magnetic tape 128 which, after a delay corresponding to the time of travel for the chain 31 between the wheel 82 and the rollers 124, produces signals in reading head 134 to operate the variable speed drive 126 for the rollers 124. The chain 31 is heated to the desired temperature, such as above the glass transition temperature, in the chamber 120 and is maintained in its length up to the rollers 124. The rollers 124 are either sped up to allow shrinkage of the chain 31 between rollers 124 and cooling station 136 or slowed down to stretch the chain 31 between the rollers 124 and the cooling station 136. Thus, the stringers of the chain 31 passing between the rollers 138 have a uniform spacing of the convolutions of the coupling members 26 and 28 throughout the length of the chain 31.

In the tape and coil configuring mechanism 70 of FIGS. 8, 9 and 10, the chain 31 is heated to the desired elevated temperature, such as above the glass transition temperature, of the thermoplastic constituents, and the interlocking coupling members 26 and 28 are forced onto the teeth 160 which by the camming surfaces 162 force the coupling members 26 and 28 from a first interlocking position where longitudinal axes of the spiral coupling members 26 and 28 are closely spaced to a second interlocking position where the longitudinal axes of the spiral coupling members 26 and 28 are spaced further apart. This application of forces transverse to the edges of the tapes 22 and 24 causes the leg portions 38 and 40 and head portions 36 to reciprocally or mutually deform each other to produce the notches 44 and 46 in each of the leg portions 38 and 40 as shown in FIG. 2. The spacing of the convolutions of the coupling members 26 and 28 is made even more uniform by the engagement with the teeth 160 and the bottom of the channel 156 determining a predetermined uniform spacing of the convolutions by stretching or allowing shrinkage of inner portions of the tapes 22 and 24. Also, the length of the outer portions of the tapes 22 and 24 is set by selectively stretching or shrinking the outer portions of the tapes 22 and 24 by engagement with the periphery 158 of the wheel 152.

While the method and apparatus for producing uniform spacing of engaging elements on stringers has been particularly described with respect to chains having spiral coupling members, the method and apparatus can be used on other types of stringers, such as stringers having coil or meander ladder coupling members, stringers having plastic or metal molded scoop engaging elements, etc. The production of uniform spacing of engaging elements in stringers results in substantial savings as well as improved fastener characteristics and the ability to interchange stringers of the same type and size.

Due to the normal expected variation in spacing of engaging elements, the stringers in the prior art were manufactured with a minimum average spacing in order to allow for the greatest spacing not producing too loose or defective coupling of the engaging elements. By greatly increasing the uniformity of the spacing of engaging elements, stringers can be manufactured with an average spacing which is much greater, i.e., less engaging elements per unit length, to produce more product, i.e., length of fastener chain per unit quantity of material used, without degrading fastener performance. For example, while a spiral slide fastener stringer in the prior art may have varied from 59 to 70 convolutions of coupling element per each 4-inch unit length (sixty to seventy-one convolutions per decimeter) and the average number of convolutions was set at 64 convolutions per 4-inch unit length (sixty-five convolutions per decimeter); with uniform spacing the stringers can be manufactured with an average number of convolutions set at 60 convolutions per 4-inch unit length (61 convolutions per decimeter) to produce a fastener chain meeting the same minimum crosswise strength requirements with approximately six percent less material to substantially reduce the costs of the fastener chain.

The stringers 22 and 24 of FIGS. 1, 2 and 3 with spiral coupling members 26 and 28 having the notches 44 and 46 formed in opposite sides of each leg portion 38 and 40 thereof has substantially improved crosswise strength and ease of operation over prior art spiral-type fastener chains. Sides 54 of the notches 44 and 46 of each leg portion 38 and 40 of the coupling member 26 engage with surface portions on similar sides of notches on the opposing coupling member 28. The sides 54 are more greatly inclined to the direction of crosswise forces, i.e., forces perpendicular to the longitudinal edges of the tapes 22 and 24 in the plane of the tapes 22 and 24, than prior art fasteners which had only the incline of phantom lines 58 engaging with opposing coupling members; these inclined surfaces 54 on the notches 44 and 46 contiguous the head portions 36 substantially increase the crosswise strength of the chain 31.

The notches 44 and 46 having generally scalene and obtuse triangular cross sections with the shortest side contiguous the head portions 36 and the next shortest side along the leg portions 38 and 40, or the leg portions 38 and 40 having a substantially uniform dimension parallel the longitudinal tape edges through lengths 52 of the leg portions results in substantially easier operation of slide fasteners. The interengaging coupling members 26 and 28 have freedom to move from one relative interengaging position to a second interengaging position, i.e., the head portions 36 can freely move relative to the opposing coupling element throughout a range about equal to length 52. The bends 59 of the coupling elements 26 and 28 within the slider 30 are much smoother or less sharp since the bends 59 required by the Y channel in the slider 30 can be rounded by the freedom of the head portions 36 of the interengaging coupling members 26 and 28 to move toward the heel portions of the opposing coupling members 28 and 26, respectively, adjacent the separation point of the coupling members 26 and 28. Less force from the slider 30 is required to make the smoother or less sharp bends, thus producing improved ease of operation of the slider 30 in opening and closing the fasteners.

The notches 44 and 46 can be formed by forming tools or by a coil master made of metallic wire or other relatively non-deformable material which can be heated to effect the thermoplastic deformation of a coupling member. The utilization of mating spiral coupling members to deform each other under forces transverse to the longitudinal tape edges in the plane of the tapes has advantages in not requiring precisely machined forming tools for forming the notches 44 and 46. Further, the particular chains and stringers thereof formed by action of mating spiral coupling members have advantages in that the reciprocating deformation of the coupling members accounts for the minute shapes and irregularities of the respective coupling members which cannot be easily anticipated or accounted for in making a forming tool; thus, the reciprocally deformed mating stringers result in improved chains.

Applying the transverse forming forces to the interengaging coupling members 26 and 28 by using the camming surfaces 162 of the members or teeth 160 engaging the head portions 36 has advantages over other methods of applying the transverse forming forces. Most of the deformation occurs contiguous the head portions, and by applying the forces by the camming surfaces 162 directly on the head portions 36, stress and deformation of other portions of the convolutions of the coupling members 26 and 28 are avoided. Also, the stringers and chains formed by the camming members 160 engaging the head portions 36 may have selective deformation in the head portions which aid in increasing crosswise strength.

Since many variations, modifications, and changes in detail may be made to the described slide fastener and the described method and apparatus of manufacture, it is intended that all matter in the foregoing description and accompanying drawings be interpreted as illustrative and not in a limiting sense.

What is claimed is:

1. A stringer for a slide fastener comprising
 a tape;
 a spiral coupling member secured to one longitudinal edge of the tape and formed from a continuous filament into successive coupling sections;
 each coupling section having a head portion, a pair of leg portions extending from respective opposite sides of the head portion, and a heel portion interconnecting to a leg portion of an adjacent coupling section,
 said continuous filament having an oblate cross section perpendicular to the filament with the longest dimension of the filament cross section in the head portions extending substantially parallel to the one edge of the tape and with the longest dimension of the filament cross section in the leg portions revolving from substantially parallel to the one edge of the tape at the head portions to an oblique angle to the tape at the heel portions;
 each of said leg portions having a notch contiguous the respective head portion to reduce the longest dimension of the filament cross section; and
 said notches having generally obtuse and scalene triangular cross sections with the head portions bordering the shortest side of the notch cross sections and with the leg portions bordering the next shortest side of the notch cross sections.

2. A stringer for a slide fastener as claimed in claim 1 wherein each of said leg portions has a substantially uniform dimension less than the longest dimension of cross section and parallel to the one edge of the tape from contiguous the respective head portion to where the revolution of the longest dimension of the cross section in each leg portion results in a dimension parallel to the one edge equal to the substantially uniform dimension.

3. A stringer for a slide fastener as claimed in claim 1 wherein the leg portions are deformed by interlocking the spiral coupling member with a mating coupling member and forcing the spiral coupling member and mating coupling member from a first interlocking position to a second interlocking position where an axis of the spiral coupling member in the second interlocking position is spaced further apart from an axis of the mating coupling member than in the first interlocking position.

4. A stringer for a slide fastener as claimed in claim 1 wherein the continuous filament has a cross section which is substantially D-shaped.

* * * * *